UNITED STATES PATENT OFFICE.

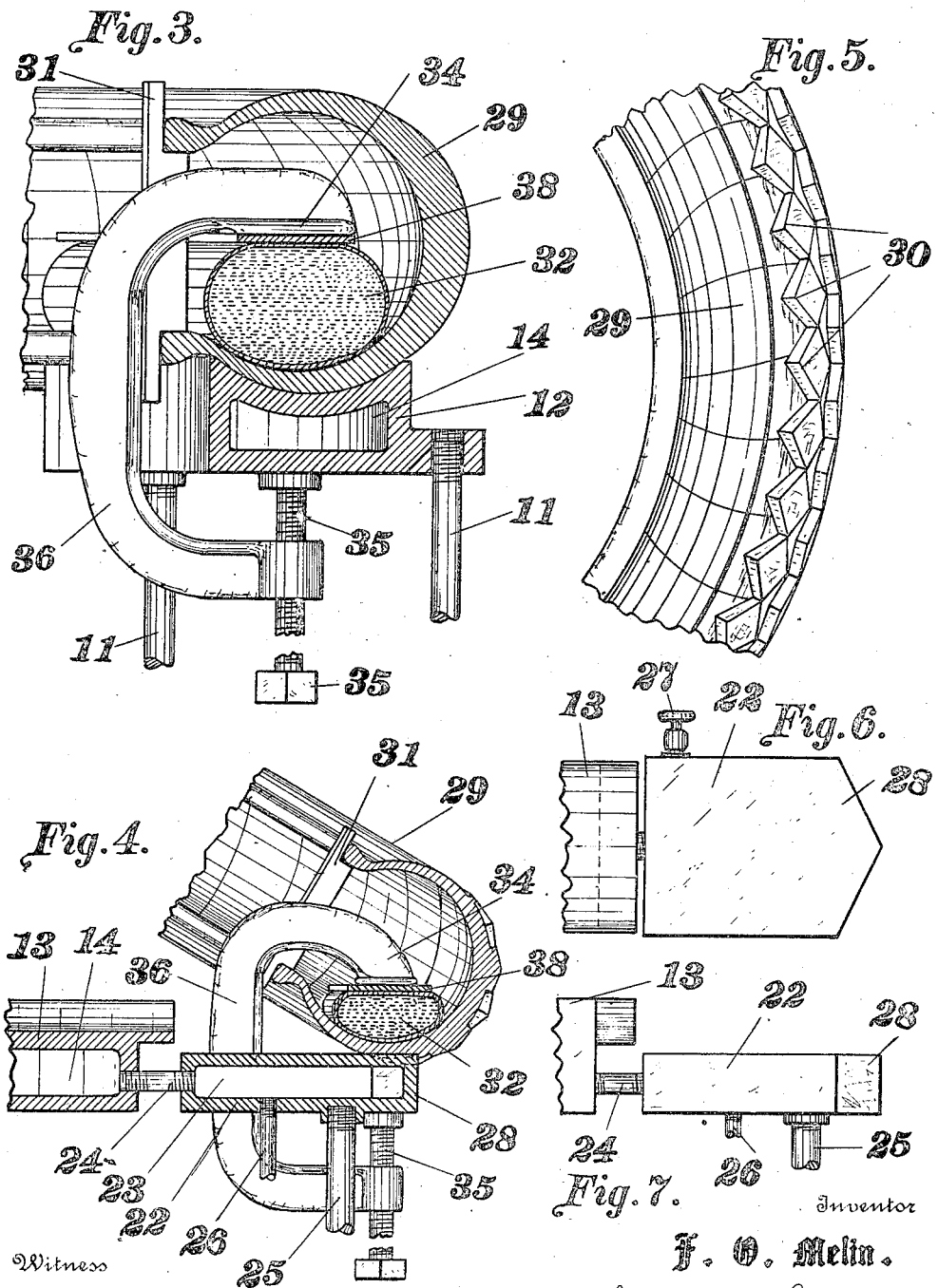

FRANK O. MELIN, OF OMAHA, NEBRASKA, ASSIGNOR OF ONE-HALF TO LOUIS H. PETERSON, OF OMAHA, NEBRASKA.

VULCANIZER.

1,376,149.　　　　Specification of Letters Patent.　　Patented Apr. 26, 1921.

Application filed May 17, 1920. Serial No. 382,049.

*To all whom it may concern:*

Be it known that I, FRANK O. MELIN, a citizen of the United States, residing at Omaha, in the county of Douglas and State of Nebraska, have invented certain new and useful Improvements in Vulcanizers, of which the following is a specification.

The present invention relates to vulcanizers of the steam type, and more particularly to devices for use in repairing the casings or shoes of pneumatic tires.

An object of this invention is to provide a vulcanizer of this type adapted particularly for repairing the side portions of tires and for repairing ruptures of small size without injury to adjacent parts of the already treated rubber composition of the tire.

Another object is to provide a device which may be used on non-skid tires wherein the treads are composed of raised studs or projections, and wherein the usual vulcanizers are not capable of treating the casings about and between these tread projections.

A further object of the invention is to provide a vulcanizer which may be applied to patches placed in the cavities or ruptures of the shoe and which may be so adjusted that it does not overlap and, consequently, over-treat or cook the rubber which is unimpaired about the fracture.

With these and further objects in view as will in part hereinafter become apparent and in part be stated, the invention comprises certain novel constructions, combinations and arrangements of parts as subsequently specified and claimed.

In the accompanying drawings,—

Fig. 3 is a transverse enlarged section taken on the line 3—3 of Fig. 1, the view being enlarged and a tire shoe being shown as applied to the vulcanizer.

Fig. 4 is a similar view showing the vulcanizer as applied to a portion of the shoe extending in between the tread projections of the tire shoe.

Fig. 5 is a fragmentary, side elevation of a portion of a tire which may be repaired by use of this vulcanizer.

Fig. 6 is a top plan view of the corner iron of the vulcanizer which is constructed to extend between projections on the tread of the tire, and Fig. 7 is a side elevation of the same.

Figure 1:
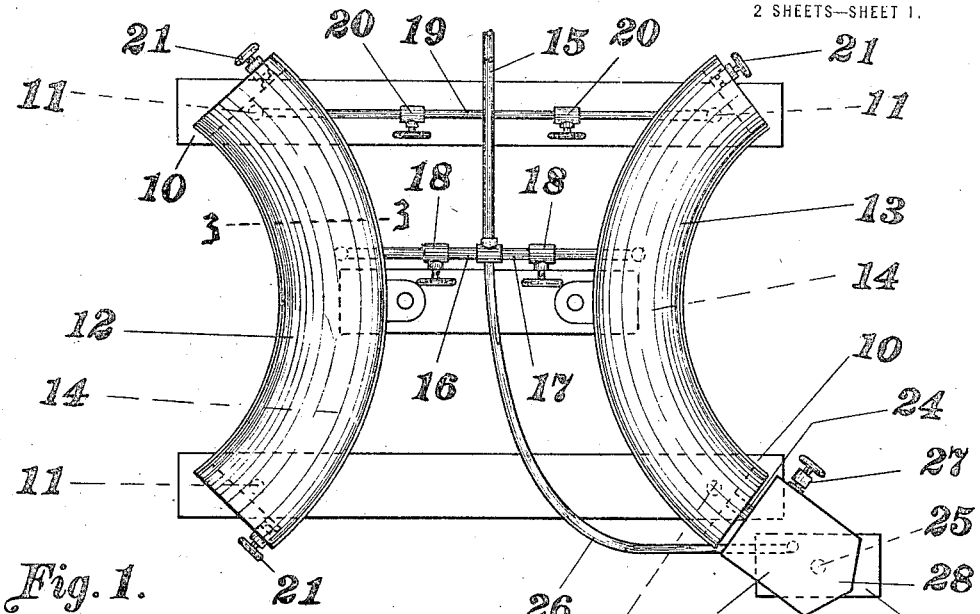
Figure 1 is a top plan view of a tire vulcanizer constructed according to the present invention.
Figure 2:
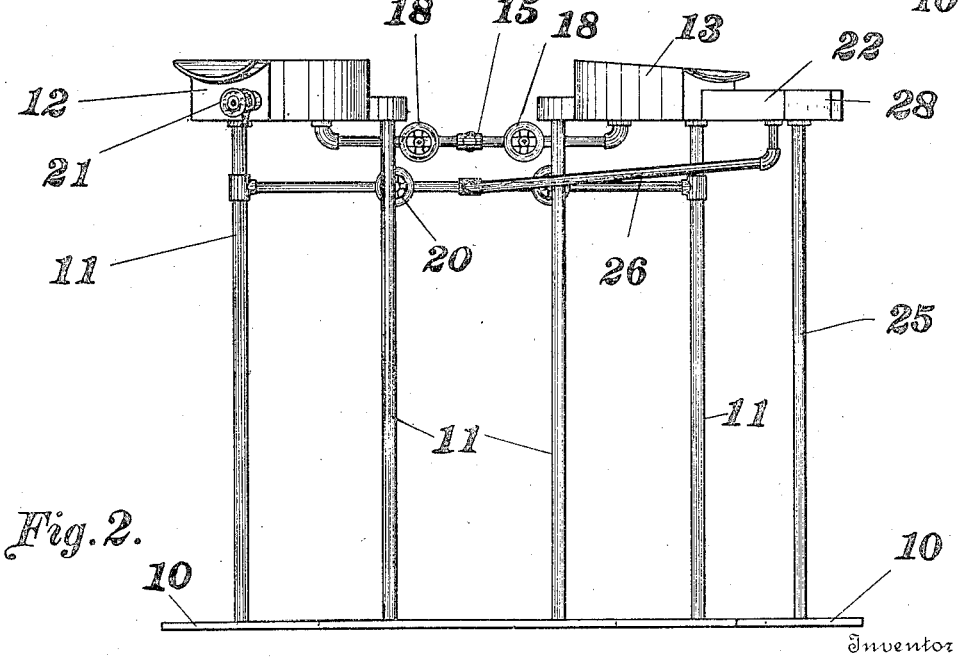
Fig. 2 is a side elevation of the same.

Referring to the drawings by numerals, 10 designates a base of suitable construction for supporting the vulcanizer, and is provided with a plurality of upstanding legs or standards 11 upon which the tire irons 12 and 13 are supported. The tire irons 12 and 13 are of hollow construction, having, as shown particularly in Fig. 3, a steam chamber 14 to which steam is admitted for heating the tire irons. The upper surfaces of the tire irons 12 and 13 are transversely concaved to substantially conform to the opposite sides of a tire casing and the irons are curved longitudinally in opposite directions to permit the treating of opposite sides of a tire shoe. A steam pipe 15, of lead or the like, extends from a source of steam and is provided with branches 16 and 17 leading to the intermediate portions of the tire irons 12 and 13, and which preferably connect with the chambers 14 of the tire irons through the bottom walls thereof. Valves 18 are preferably interposed in the pipes 16 and 17 for controlling the circulation of steam through the tire irons. Near one side of the device the tire irons are connected together by a pipe 19, establishing intercommunication between the chambers 14 for admitting the passage and equal distribution of steam through the two tire irons. The pipe 19 is also preferably provided with controlling valves 20 arranged near the respective tire irons.

For the purpose of facilitating the drainage of water of condensation and of cleaning out the interior of the tire irons, the latter are provided at their ends with valves or plugs 21 adapted to admit the escape of steam and water from the tire irons.

One of the tire irons, such as the iron 13, is provided at one end with a corner iron 22 of relatively flat formation, and having a steam chamber 23 therein communicating with the adjacent tire iron 13 by a spud or short length of pipe 24. This corner iron 22 may be supported upon an independent standard or post 25, which rises from the base 10, and the steam pipe 15 may have an extension 26 which leads into the bottom of the chamber 23 of the corner iron 22. By means of these pipes 24 and 26, steam may be admitted to the corner iron and maintained under substantially the same pressure and heat as is maintained in the main tire irons. A drainage and blow-off valve 27 is mounted in one side of the corner iron 22. The upper face of the corner iron 22 is preferably flat, while the outer end of the corner iron is tapered or beveled off to form a projecting nose 28 adapted to fit between surface projections on the tread of a tire shoe.

The vulcanizer of this invention is adapted particularly for use in the repair of the side walls of tire shoes or casings 29, such as shown in Fig. 5. This type of shoe or casing has relatively smooth side walls and has a tread portion made up of a plurality of surface projections 30, shown in the present illustration as of diamond formation. For this type of tire, the corner iron 22 has its outer end beveled or tapered sufficiently to fit between the diverging walls of adjacent diamond projection to thus fully and thoroughly treat the surface portions of the shoe between the projections when it is desired to make a repair at such point. In this way, the tire iron may be directly applied against the side of the casing and the presence of projections 30 will not interfere with the application of the shoe to the vulcanizer or with the satisfactory operation of the same. It is essential in using these repair vulcanizers that the rubber or composition about a rupture be not over-cured, as such over-curing hardens the rubber to that extent which makes it brittle and easily worn away. By the use of the corner iron 22 the same may be made to bear against an applied patch at the exact margin of the patch so as not to injure the surrounding rubber.

The same applies to the use of the main tire irons 12 and 13, because the shoe or casing 29 may be placed with one side resting in the concaved upper surface of the tire iron in a manner so as to apply the tire iron only to the portion which is to be repaired.

As shown in Fig. 3, the casing or shoe 29 is spread open by spreaders or blocks 31, which are fitted between the beads or flanges of the tire to hold the latter in open or spread position. While in this position, the tire 29 is seated in the concaved upper face of the tire iron, a sand-bag 32, or the like, is placed within the casing and against the side which is placed in the tire iron, a substantially U-shaped clamp 33 is applied with its bearing end 34 seated on the sand-bag 32 and the other end of the clamp 33 is provided with a set screw 35 which bears against the bottom of the tire iron 12, or 13, to force the presser end against the sand-bag and thus hold the side of the tire against the inner curved surface of the tire iron. While in this position, the steam is admitted to the interior of the tire iron and the rubber patch is thus properly heated. The casing is so adjusted on the tire iron as to bring the applied patch only into contact with the tire iron and thus prevent injury to the remaining portion of the tire.

The corner iron 22 is mounted upon the end of the main iron 13 so as to be within easy access by the operator, and so that the shoe may be quickly applied to the corner iron with the projection 28 thereof fitting between the surface projections of the tire shoe. The heat may thus be distributed over the surface of the casing being treated and may also be applied to the tire surface between the projections without pressing or applying undue heat thereto.

As shown in Fig. 4, when the corner iron is applied to the tire, it is secured thereagainst by the U-shaped clamp 36 having one end provided with a binding screw 37 for engagement beneath the corner iron 22 and with its other end in the form of a presser foot. The sand-bag 32 which is applied within the tire supports a metallic plate 38 against which the presser foot of the clamp 36 bears. By means of this device, the smooth outer surface of the tire shoe may be treated and repaired to any desired extent and the corner iron 22 facilitates the repair of fractures which extend into the tread portion of the tire.

It is, of course, understood, that when non-skid tires of other configuration than shown in the accompanying drawings are to be repaired, the corner iron 22, which is shown, may be removed and a similar iron substituted therefor with a projection 28 which is of such formation and width as to properly fit between the surface projections of other tires.

It is apparent that the side of the tire may thus be vulcanized and repaired without heating the tread of the tire and thus the wearing qualities of the entire tire will not be impaired by the process of vulcanization. The tread portion, and other parts of the tire, are free from the vulcanization and are not subjected to the heat, so that the other parts of the tire cannot be over cured or cooked to that extent which renders them susceptible of crumbling.

It is, of course, understood that various changes and modifications may be made in the details of construction, design, size, proportion and materials of the above specifically described embodiment of this invention without departing from the spirit thereof, such changes and modifications being restricted only by the scope of the following claims.

What is claimed is:—

1. A tire vulcanizer having a corner iron with a chambered interior for receiving steam to heat the iron and with an angular projection at one end, constituting a continuation of the supporting surface of the iron for extending between and about projections on the surface of a tire casing.

2. In a tire vulcanizer, a tire iron curved longitudinally and transversely for receiving a side of a tire casing therein, a corner iron provided with a projection adapted to extend between surface projections on a tire casing, means for admitting steam to said first iron and to the corner iron, and coupling means between the irons for establishing communication therebetween.

3. In a tire vulcanizer, a base, standards rising from the base, a pair of reversely curved tire irons mounted on the standards adapted to receive one at a time the opposite sides of a tire casing, means for admitting steam to said tire irons for heating the same, means for establishing circulating communication between the tire irons, and a corner iron connected to and carried upon one end of one of said first irons and provided with a projecting portion of reduced width adapted to extend into spaces between surface projections of a tire casing to repair the latter between such projections.

In testimony whereof I have affixed my signature in presence of two witnesses.

FRANK O. MELIN.

Witnesses:
ARTHUR H. STURGES,
HIRAM A. STURGES.